(12) United States Patent
Craig et al.

(10) Patent No.: US 8,339,307 B2
(45) Date of Patent: Dec. 25, 2012

(54) SATELLITE BEAM-POINTING ERROR CORRECTION IN DIGITAL BEAM-FORMING ARCHITECTURE

(75) Inventors: Anthony Duncan Craig, Hitchin (GB); Paul Stephen Norridge, Harston (GB)

(73) Assignee: Astrium Limited, Hertfordshire (GB)

( * ) Notice: Subject to any disclaimer, the term of this patent is extended or adjusted under 35 U.S.C. 154(b) by 798 days.

(21) Appl. No.: 12/279,295

(22) PCT Filed: Feb. 29, 2008

(86) PCT No.: PCT/GB2008/050139
§ 371 (c)(1),
(2), (4) Date: Aug. 13, 2008

(87) PCT Pub. No.: WO2008/107710
PCT Pub. Date: Sep. 12, 2008

(65) Prior Publication Data
US 2010/0231442 A1 Sep. 16, 2010

(30) Foreign Application Priority Data

Mar. 3, 2007 (GB) .................................. 0704189.0
Mar. 5, 2007 (EP) .................................. 07250900

(51) Int. Cl.
*H04B 7/185* (2006.01)
(52) U.S. Cl. ...................................... 342/354
(58) Field of Classification Search ........... 342/354–355
See application file for complete search history.

(56) References Cited

U.S. PATENT DOCUMENTS 4,586,051 A 4/1986 Saitto et al.
4,663,631 A * 5/1987 Brilman et al. ............... 342/422
5,103,233 A * 4/1992 Gallagher et al. ............ 342/408
5,369,624 A * 11/1994 Fukukita et al. .............. 367/103
(Continued)

FOREIGN PATENT DOCUMENTS

EP 0 971 241 A1 1/2000
(Continued)

OTHER PUBLICATIONS

S.P. Dulac, Satellite Direct-to-Home, Proceedings of the IEEE, vol. 94(1), p. 158-172, Jan. 2006.*

(Continued)

*Primary Examiner* — Jack W Keith
*Assistant Examiner* — Fred H Mull
(74) *Attorney, Agent, or Firm* — Pearl Cohen Zedek Latzer, LLP

(57) ABSTRACT

A digital method of determining and correcting beam-pointing for a communications spacecraft that has a digital beam-forming architecture for defining multiple spot transmit and receive beams, the antenna system of the spacecraft including a receive antenna (DRA, AFR) having antenna elements providing respective antenna element signals, and wherein at least one of the uplink signals to the spacecraft includes a beacon signal, and wherein the method comprises digitally weighting components of said beacon signal present in antenna element signals, combining such weighted beacon signal components such as to derive beam-pointing error signals, and employing the error signals to adjust beam-forming weight values of the receive antenna, in order to adjust the pointing direction of at least one signal beam. The digital weights for the beacon signal define difference radiation patterns for x, y axes of the antenna which vary rapidly in a range corresponding to the pointing errors most commonly occurring.

43 Claims, 8 Drawing Sheets

U.S. PATENT DOCUMENTS

| | | | |
|---|---|---|---|
| 5,754,139 A * | 5/1998 | Turcotte et al. | 342/373 |
| 5,995,495 A * | 11/1999 | Sampson | 370/316 |
| 2003/0043068 A1 | 3/2003 | Gayrard et al. | |
| 2004/0113838 A1 | 6/2004 | Wang et al. | |
| 2004/0173257 A1 * | 9/2004 | Rogers et al. | 136/293 |
| 2004/0202292 A1 * | 10/2004 | Cook | 342/357.12 |
| 2004/0242152 A1 | 12/2004 | Jarett | |
| 2006/0183504 A1 | 8/2006 | Tanaka et al. | |
| 2006/0292990 A1 | 12/2006 | Karabinis et al. | |
| 2008/0291864 A1 * | 11/2008 | Chang | 370/316 |
| 2009/0072921 A1 * | 3/2009 | Schmid | 332/145 |

FOREIGN PATENT DOCUMENTS

| | | |
|---|---|---|
| EP | 1 076 377 A2 | 2/2001 |
| GB | 2 318 947 A | 5/1998 |
| GB | 2 363 000 A | 12/2001 |
| JP | H05-275920 | 10/1993 |
| JP | H10-290112 | 10/1998 |
| JP | 2003-078329 | 3/2003 |
| JP | 2003-142939 | 5/2003 |
| WO | WO 01/24409 | 4/2001 |

OTHER PUBLICATIONS

R.B. Dybdal, Antenna Tracking, in J.L. Volakis, Antenna Engineering Handbook. 4$^{th}$ Ed., p. 42-12 to 47-17, 2007.*

Satellite design and construction, Radio-electronics.com, http://www.radio-electronics.com/info/satellite/satellite_design/satellite_design.php, Jul. 2005.*

What is Dish Network Satellite Transponder?, Satellite TV Wiz, http://www.satellitetvwiz.com/440/dish-network/what-is-dish-network-satellite-transponder.*

Extended Definition: satellite television, Webster's Online Dictionary, http://www.websters-dictionary-online.com/definitions/satellite%20television.*

UK Intellectual Property Office, Search Report under Section 17 for GB Application No. 0704189.0. Date of search: Jun. 14, 2007, pp. 1-2.

European Patent Office, European Search Report for EP Application No. 07 250 900.3. Date of Search: Jul. 17, 2007, pp. 1-3.

International Preliminary Report on Patentabiliy for International Application No. PCT/GB2008/050139 issued Sep. 8, 2009.

English Translation of the Notice of Reasons for Rejection issued in Japanese Patent Application No. 2009-552278, mailed on Jun. 12, 2012.

* cited by examiner

SATELLITE BEAM-POINTING ERROR CORRECTION IN DIGITAL BEAM-FORMING ARCHITECTURE

CROSS-REFERENCE TO RELATED APPLICATIONS

This application is a national phase application of PCT/GB2008/050139 filed on Feb. 29, 2008, which in turn claims priority from GB Application no. 0704189.0, filed on Mar. 3, 2007, and EP Application No. 07250900.3, filed on Mar. 3, 2007, each of which are incorporated by reference herein in their entirety.

TECHNICAL FIELD

The present invention relates to a method and apparatus for accurate beam-pointing for space satellites, in the context of payload digital beam-forming.

BACKGROUND ART

Key trends in satellite communications include the use of digital beam-forming architecture within the payload design and the provision of coverage over global regions in the form of narrow spot beams. Multiple spot beam coverage provides advantages of gain and frequency reuse. It is known accurately to define such narrow spot beams, with a multi-element antenna system, by digital beam-forming techniques involving assigning complex digital weights to each communication frequency channel for controlling spot beam parameters: see A. M. Bishop et al "The INMARSAT 4 Digital Processor and Next Generation Developments", 23rd AIAA ICSSC, Rome, Italy, September 2005. Further improvements are nevertheless desirable, particularly in accuracy of beam-pointing, which is at present only nominally accurate, since beam-pointing errors may significantly affect gain.

As a technique, it is well-known to provide ground beacons for providing a satellite with reference signals from accurately known positions, enabling the satellite to measure pointing error relative to the beacons by means of an RF sensing system and to correct the pointing error by adjustment of its attitude and/or antenna orientation.

SUMMARY OF THE INVENTION

The present invention provides, in a first aspect, a method of beam-forming for an antenna of a spacecraft, the spacecraft forming part of a system that includes ground stations communicating with an antenna system of the spacecraft by means of uplink signals and downlink signals, each in a respective frequency channel, which antenna system includes a receive antenna having a plurality of antenna elements arranged in an array, each element providing a respective antenna element signal, the method comprising:

digitising each said antenna element signal, and processing each digitised antenna element signal to separate uplink signal components in respective frequency channels present in the element signal;

digitally weighting, with respective beam-forming weight values, said uplink signal components in at least one frequency channel, and combining the weighted components to synthesise the uplink signal in said one frequency channel;

wherein at least one of said uplink signals includes a beacon signal, and wherein the method further comprises:

digitally weighting, with respective beam-pointing error weight values, components of said beacon signal present in at least some of the antenna element signals, and assessing such weighted beacon signal components such as to derive a beam-pointing error signal; and employing said error signal to adjust the pointing direction of at least one communications signal beam provided by said antenna system.

In accordance with the invention, the beam-pointing error weight values are such that the beacon signal components, of some or all of the antenna element signals, when weighted with respective beam-pointing error weight values, provide a means for assessing or measuring a beam-pointing error, as will be explained in more detail below. A beam-pointing error signal is derived, containing beam-pointing error measurement information, and this is employed to adjust the pointing direction of one or more communications beams.

In a second aspect, the invention provides apparatus for forming a beam of a spacecraft for use in the aforesaid method, comprising:

a receive antenna including a plurality of antenna elements arranged in an array, each antenna element providing a respective antenna element signal in response to received uplink signals in respective frequency channels, uplink signal synthesis means including digital processing means for digitising each said antenna element signal, and for separating uplink signal components in each frequency channel present in each said antenna element signal, and beam-forming weighting means for digitally weighting said uplink signal components in at least one frequency channel with respective beam-forming weight values, and combining means for combining such selected components to synthesise at least one uplink signal in a respective frequency channel;

beacon direction assessment means responsive to a beacon signal comprising one of said uplink signals in a respective frequency channel, and including beam-pointing error weighting means for digitally weighting components of said beacon signal present in at least some of the antenna element signals with respective beam-pointing error weight values, and assessment means for assessing the weighted beacon signal components to derive a beam-pointing error signal; and adjustment means for employing said error signal to adjust the pointing direction of at least one communications signal beam provided by the spacecraft.

In a third aspect, the invention provides a method of beam-forming for an antenna of a spacecraft, the spacecraft forming part of a system that includes ground stations communicating with an antenna system of the spacecraft by means of uplink signals and downlink signals, each in a respective frequency channel, which antenna system includes a receive antenna and a transmit antenna, each said antenna including a plurality of antenna elements arranged in an array, each element having an associated respective antenna element signal, the method comprising:

digitising each said element signal from said receive antenna, and processing each digitised antenna element signal to separate uplink signal components in respective frequency channels present in the element signal, providing downlink signals in respective frequency channels and in digital form, which are selectively digitally weighted, with respective beam-forming weight values, to synthesise downlink antenna element signals for the antenna elements of said transmit antenna;

wherein at least one of said uplink signals includes a beacon signal, and wherein the method further comprises:

digitally weighting, with respective beam-pointing error weight values, components of said beacon signal present in at least some of the antenna element signals from said receive antenna, and assessing such weighted beacon signal components such as to derive a beam-pointing error signal; and employing said error signal to adjust the pointing direction of at least one communications signal beam provided by said transmit antenna.

In a fourth aspect, the invention provides apparatus for forming a beam of a spacecraft for use in the aforesaid method, comprising:

a receive antenna and a transmit antenna, each antenna including a plurality of antenna elements arranged in an array, and each antenna element providing a respective antenna element signal in response to uplink/downlink signals in respective frequency channels, uplink signal synthesis means including digital processing means for digitising each receive antenna element signal, and for separating uplink signal components in each frequency channel present in each said antenna element signal, downlink signal synthesis means including digital means for selectively forming downlink signals in respective frequency channels, and beam-forming weighting means for selectively digitally weighting downlink signals in respective frequency channels with respective beam-forming weight values, for providing antenna element signals to said transmit antenna;

beacon direction assessment means responsive to a beacon signal comprising one of said uplink signals in a respective frequency channel, and including beam-pointing error weighting means for digitally weighting components of said beacon signal present in at least some of the antenna element signals of the receive antenna with respective beam-pointing error weight values, and assessment means for assessing the weighted beacon signal components to derive a beam-pointing error signal; and adjustment means for employing said error signal to adjust the pointing direction of at least one communications signal beam provided by the spacecraft.

The present invention as set forth above is applicable to spacecraft having separate transmit and receive antennas, or alternatively having an antenna which combines both receive and transmit functions.

The present invention provides a means of correcting the direction of a beam in a highly accurate way, and this may enable signal gain to be maximised both for uplink and downlink signals.

The present invention is comprised in a digital beam-forming mechanism, which may be of the type mentioned in the above cited reference. Since the present invention includes digital beam-forming means which assigns weight values to signal components in respective frequency channels, the assigning of further weight values to beacon signal components in a beam-pointing error measurement mechanism represents only a small additional processing overhead. As preferred for convenience, the beam-pointing error measurement mechanism is physically integrated with the uplink digital beam-forming mechanism.

The present invention is applicable to any type of multiple element receive antenna that may be used in satellite communication technology, in particular Direct Radiating Arrays (DRA), Array Fed Reflector (AFR), Imaging Phased Arrays (IPA).

In the case of a DRA, the antenna may be comprised of a two-dimensional matrix of antenna elements, typically but not necessarily identical, and each antenna element provides a respective element signal.

In the case of an AFR, a two dimensional array of feed horns, comprising said antenna elements, are directed at a large reflector, each element or feed horn providing a respective antenna element signal. The array of feed elements are offset from the focal plane of the reflector such that the far field beam pattern associated with a given feed is directional. The array may typically comprise 100 or more feed horns, but in order to form a spot beam, only a subset of feed horns may be used, e.g. 20.

In an IPA, the aperture diameter of a primary DRA is magnified by means of antenna "optics". For the purposes of the present invention, an IPA operates in a similar manner to a DRA, having antenna elements which each provide an element signal.

The weight values provided in accordance with the invention will be complex values, having real and imaginary components, equivalent to having amplitude and phase information $(A,\phi)$.

Said beam-pointing error weight values are preferably chosen to synthesise a radiation pattern for the receive antenna (by which is meant the locus of antenna gain and phase for all possible directions of a received signal) which rapidly varies at least for a certain spread of direction angles, corresponding to those beam-pointing errors commonly occurring. This variation is significant enough to provide increased resolution of beam-pointing errors in comparison to known beam-forming techniques described above.

Whilst such synthesised radiation patterns for beam-pointing error may take a wide variety of forms, it has been found, that particularly for Direct Radiating Antennas (DRA) and Array Fed Reflectors (AFR) that a suitable function synthesises a difference radiation pattern along one axis of the antenna array with an amplitude null, with amplitude rising quickly on either side of the null, typically with a 180° phase difference. A similar difference pattern may be synthesised for a perpendicular axis. A sum radiation pattern may be employed to normalise the difference radiation patterns. The terms "difference radiation pattern" and "sum radiation pattern" will be recognised as terms of art by those skilled in the art, and are explained hereinbelow.

Alternatively, a single null point may be provided with gain increasing in radial direction away from it equally for all azimuth directions but with phase varying through a range of 360° according to azimuth angle.

Once the resultant pointing error signal has been determined, a beam direction may be corrected in a number of ways. For example, the attitude of the satellite may be adjusted in pitch and roll. Alternatively the pointing error may be adjusted by a mechanical antenna pointing mechanism.

However as preferred since the invention is incorporated in a digital beam-forming mechanism, where the error signal takes the form of pointing error signals, for both (x, y) axes of the receive antenna, the error signals are applied to a DBFN weight control device, in order to adjust said beam-forming weight values, in order to change beam direction, as will be described in more detail below.

The satellite beam that is corrected may be a beam of the receive antenna; alternatively it may be a transmit beam of a common receive/transmit antenna, or of a separate transmit antenna. Any number of beams may be corrected in this way.

More than one ground station may provide a beacon signal; two separate beacon signals may be necessary where the yaw angle of the space craft is to be adjusted in addition to pitch and roll. Alternatively, the two separate beacon signals may provide electronic correction of beam pointing error on an individual beam basis using beam pointing error values calculated from the two beacon pointing error measurements according to simple trigonometric calculations.

The beacon signal may be provided by a dedicated ground station, with a coded beacon signal. Alternatively the beacon signal may comprise an uplink communication beam from a ground station with an accurately known position.

Where a large number of spot beams are provided, the pointing error of each beam may not be correlated with the others. In this case, each uplink communication signal may serve as a beacon for correcting the pointing of the beam for that uplink signal.

BRIEF DESCRIPTION OF THE DRAWINGS

Preferred embodiments of the invention will now be described with reference to the accompanying drawings, wherein.

DESCRIPTION OF THE PREFERRED EMBODIMENTS

A digital beam-forming architecture, together with a multi-element antenna system, provides flexible and independent reconfiguration of beams associated with different frequency channels. This may be used to provide global, shaped regional or narrow spot beams on an individual frequency channel basis. The ability to change the location of spot beams provides a means of routing capacity between different ground locations.

When channels are used within narrow spot beams the issue of gain loss due to pointing error becomes important; this is particularly important at the beam edge where the gain slope is high.

The invention relates to an enhancement to digital beam-forming architecture, which enables high beam-pointing accuracy to be maintained. Key features of a preferred embodiment of the invention are the inclusion of an RF sensing system (using one or more ground beacons) within such a digital beam-forming architecture in order to measure pointing error and the correction of the pointing error by updating of the complex weights within the digital beam-forming that is used to define beam properties (or by other means such as the spacecraft attitude control or a mechanical antenna pointing mechanism). Electronic beam-pointing correction is effectively instantaneous whereas mechanical correction is subject to time delays.

The pointing correction is applicable to a transmit antenna that shares the same feeds or platform (such that receive and transmit pointing errors are correlated).

A single beacon (or 2 if yaw control is included) is sufficient if the communications beam-pointing errors are correlated with the beacon pointing error. In a variation on the invention the communications uplink signals are used by the RF sensing processing such that multiple spot beams may undergo independent beam control.

An important class of satellite receive antenna involves multiple elements where independent control of the amplitude and phase weighting serves to determine the beam properties. Specifically within this class is the direct radiating array (DRA) (where the aperture is formed by a 2 dimensional array of radiating elements), an imaging phased array (IPA) (where the aperture diameter of a primary DRA is magnified by means of antenna "optics") and the array fed reflector (AFR) (where an array of feed elements are offset from the focal plane of a reflector such that the far field beam pattern associated with a given feed is directional).

Figure 1:
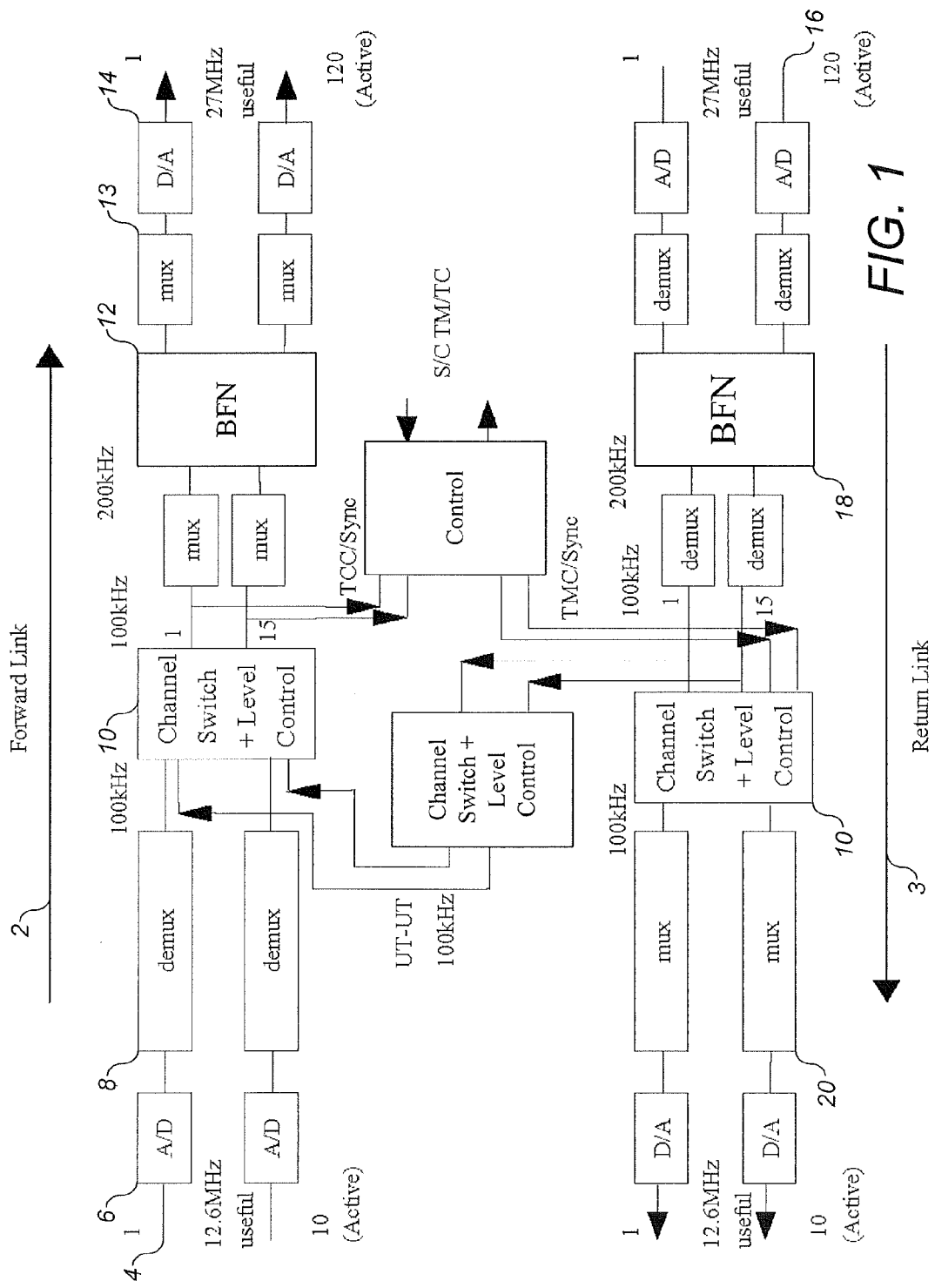
FIG. 1 is a schematic block diagram of a known form of processing uplink and downlink signals in a communications satellite, incorporating a beam-forming mechanism.

A preferred embodiment of the invention may be incorporated in a narrow band digital beam-forming architecture, an example of which is shown in FIG. 1 where beam-forming is performed independently for each frequency channel. A Forward Link processor 2 supports the link from a fixed Earth station C-band uplink (4-8 GHz) to a mobile terminal L-band (1-2 GHz) downlink, and a Return Link processor 3 supports the link from a mobile terminal L-band uplink to the fixed Earth station C-band downlink. The signals on Forward Link 2 are delivered to the processor in a number of 12.6 MHz sub-bands 4 that correspond to subdivisions of the spectrum on each of the two polarisations on the uplink. Each sub band is sampled by an A/D converter 6. Each sub band is demultiplexed at 8 into narrowband channels (100 kHz) using an efficient Fast Fourier Transform (FFT) filter bank. A switching function 10 is required to allow the selection of the required channels from the total sub-band spectrum and to provide flexible frequency mapping between the uplink and the downlink. Also at this point the individual channels have a programmable gain applied to them.

The channels are then routed to some or all of the downlink transmit antenna feed elements where the beam properties are defined at 12 by flexible control of the complex digital beam-forming weights. Included in the beam-forming processing is the combination of the channels that use the same frequency on the downlink. The individual element signals are frequency multiplexed at 13 using the same type of FFT filter function. Element signals are D/A converted at 14 and input to post-processing chains.

The Return Link processor 3 supports the link from a mobile terminal L-band uplink to the fixed Earth station C-band downlink. The same type of processing functions are performed but the data flow direction is reversed. The processor inputs are from the mobile receive antenna elements 16 where the analogue signals are converted to digital samples, which are demultiplexed to individual channels (200 kHz) before the beam-former function. The beam-former function 18 applies the complex weighting and then a summation across the elements produces the final beam-formed channel signal. Before multiplexing the signals at 20 for the feeder downlink, a programmable gain adjustment may be applied at 10.

As will be described, the beam-pointing error measurement and correction mechanism of the invention may be incorporated with beam former function 18, for adjusting beam direction of the receive (mobile) antenna for the return link. Alternatively or in addition, the pointing correction mechanism of the invention may be incorporated with beam former function 12, for adjusting beam direction of the transmit (mobile) antenna for the forward link.

Figure 2:
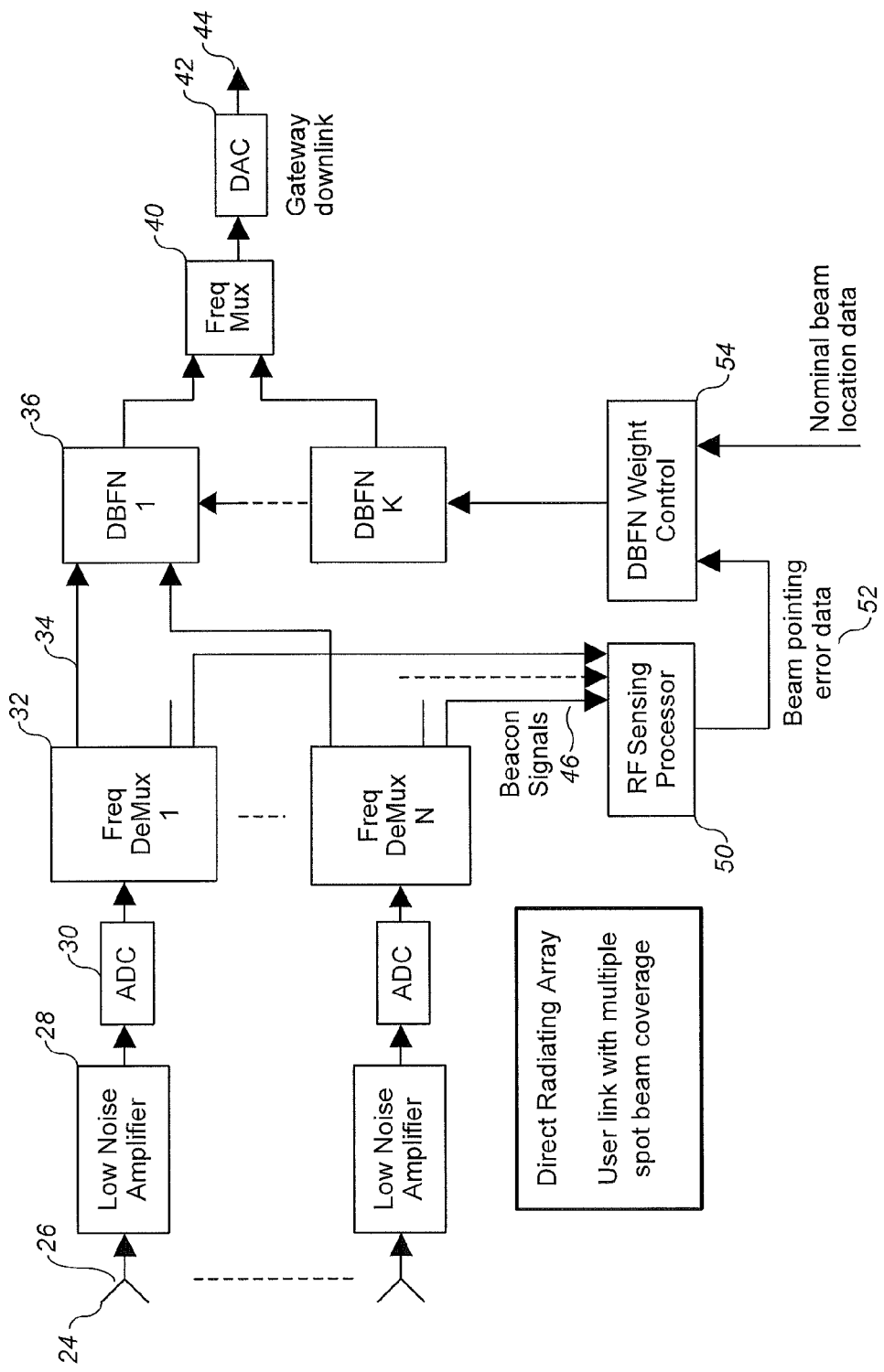
FIG. 2 is a schematic block diagram of a beam-forming mechanism, incorporating a beam-pointing error detection and correction mechanism, according to a preferred embodiment of the invention.

Referring to FIG. 2, this shows schematically a beam-forming arrangement for the Return Link 3 of FIG. 1, but in a somewhat different representation, with more detail of the beam-forming function, and showing a beam-pointing error correction mechanism. In FIG. 2, a Direct Radiating Array (DRA) antenna has a large number of antenna elements 24, each providing an element signal 26.

The DRA receives multiple carriers on different frequencies from a series of transmit ground stations at different locations on the earth. Each element 24 of the DRA (N elements say) receives the complete system spectrum comprising the sum of the individual carriers. Following low noise amplification at 28, down-conversion and filtering to reject out of band signals, each element signal is sampled in an Analogue to Digital Converter (ADC) 30 such that the full system spectrum is defined in the form of a sequence of digital samples (at a rate consistent with the system bandwidth). The sampled signal for each element is digitally frequency de-multiplexed at 32 to provide independent digitally sampled (complex samples) representations for each of a series of individual frequency channels 34 making up the overall system bandwidth (K channels say). A given frequency channel may contain a single carrier or multiple carriers or a given wideband carrier may be shared across multiple channels.

A respective Digital Beam-Forming Network (DBFN) 36 is associated with each of the K channels. A given DBFN receives the channel specific signals from each of the N elements, multiplies the samples by a complex weight that is specific to a given element and sums the weighted element contributions to form the final channel output 38. The properties of the beam associated with a given frequency channel are controlled by the choice of the complex weights and may be changed over time simply by changing the weights. For example, if it is required to form a maximum gain spot beam in a given direction, the weights are chosen such that a linear phase gradient is formed across the aperture of the array (assumed to be planar) such that the contributions from all the elements add coherently in order to maximize gain in the required direction (equivalent to forming a minimum beam-width spot beam). Alternatively the weights may be chosen to form wider or shaped beams. A given frequency channel output from the frequency de-multiplexer 32 may feed multiple DBFNs corresponding to beams in different directions which share the same frequency band (when the system includes spatial frequency reuse). The overall set of channels formed in this way are then, in this embodiment, frequency multiplexed at 40, converted to analog form in a DAC 42, to form a downlink signal 44.

The above description is also applicable to an IPA. For the AFR case the architecture is similar except that the beam associated with a given frequency channel is typically formed by the weighted combination of a subset of the feed signals (typically with a limited set of feeds having a high amplitude weighting to form the main lobe and other feeds weighted to limit side-lobe levels).

The same architecture is also applicable to a transmit antenna system with the digital beam-forming circuits having the complex weight multiplication after an N way splitting of the downlink channel signal and with a set of N digital frequency multiplexers (and associated Digital to Analogue Converters (DAC)) combining the channel frequency contributions to each of the DRA elements.

The receive architecture described is usually used in the context of a system producing multiple spot beam coverage with the control of the DBFN weights providing flexible routing of the frequency channels to different ground station locations in accordance with variations in traffic distribution.

The high gain advantage of spot beam coverage can only be exploited if the beam-pointing direction is sufficiently accurate. Pointing error results in gain loss, which is maximum at the beam edge where the gain slope is largest. Typically a pointing accuracy of 10% of the half power beam width is considered to be acceptable. Pointing is conventionally controlled on satellites through the attitude control system with the antennas being rigidly mounted on the satellite. For systems involving narrow spot beams (typically below 1 degree) this approach does not give sufficient accuracy. This embodiment relates to an) extension of the above digital beam-forming architecture that enables accurate beam-pointing to be maintained.

The invention relies on the use of one or more RF beacons at known locations on the ground. The beacons may typically be narrowband at a frequency lying within the system bandwidth as used by the uplink communications signals. One of the frequency slots that is output from the set of N frequency de-multiplexers may typically contain the beacon frequency. The set of N de-multiplexer outputs 46, containing the beacon frequency signal components from the antenna element signals, is input to an RF sensing processor 50. These signals may potentially undergo a further stage of digital filtering if the beacon bandwidth is smaller than the de-multiplexer output bandwidth in order to improve signal to noise ratio. The beacon may also be modulated with a specific coded signal that is known to the onboard beam-pointing system in order to ensure that no other signal is incorrectly identified as the beacon. The RF sensing processor 50 comprises a number of digital beam-forming networks (FIG. 3), which are used to construct error signals 52 in 2 dimensions defining the error between the actual pointing direction of the beacon and the ideal pointing direction of the beacon. The error signals are applied to a DBFN weight control device 54, which also accepts nominal beam location data, and which acts to modify the complex values of the DBFN 36 in dependence on the updated pointing error information.

In the RF sensor 50, a radiation pattern provided by a DRA is defined by choice of digital beam-pointing error weights applied to the element signals, so that beam-pointing errors are measured. By "radiation pattern" is meant the locus of antenna gain and phase values, when represented in graphical form, for all incoming directions of radiation. For a DRA, such pattern is conveniently represented as a 3-Dimensional Cartesian graph, as will be explained below.

Figure 3:
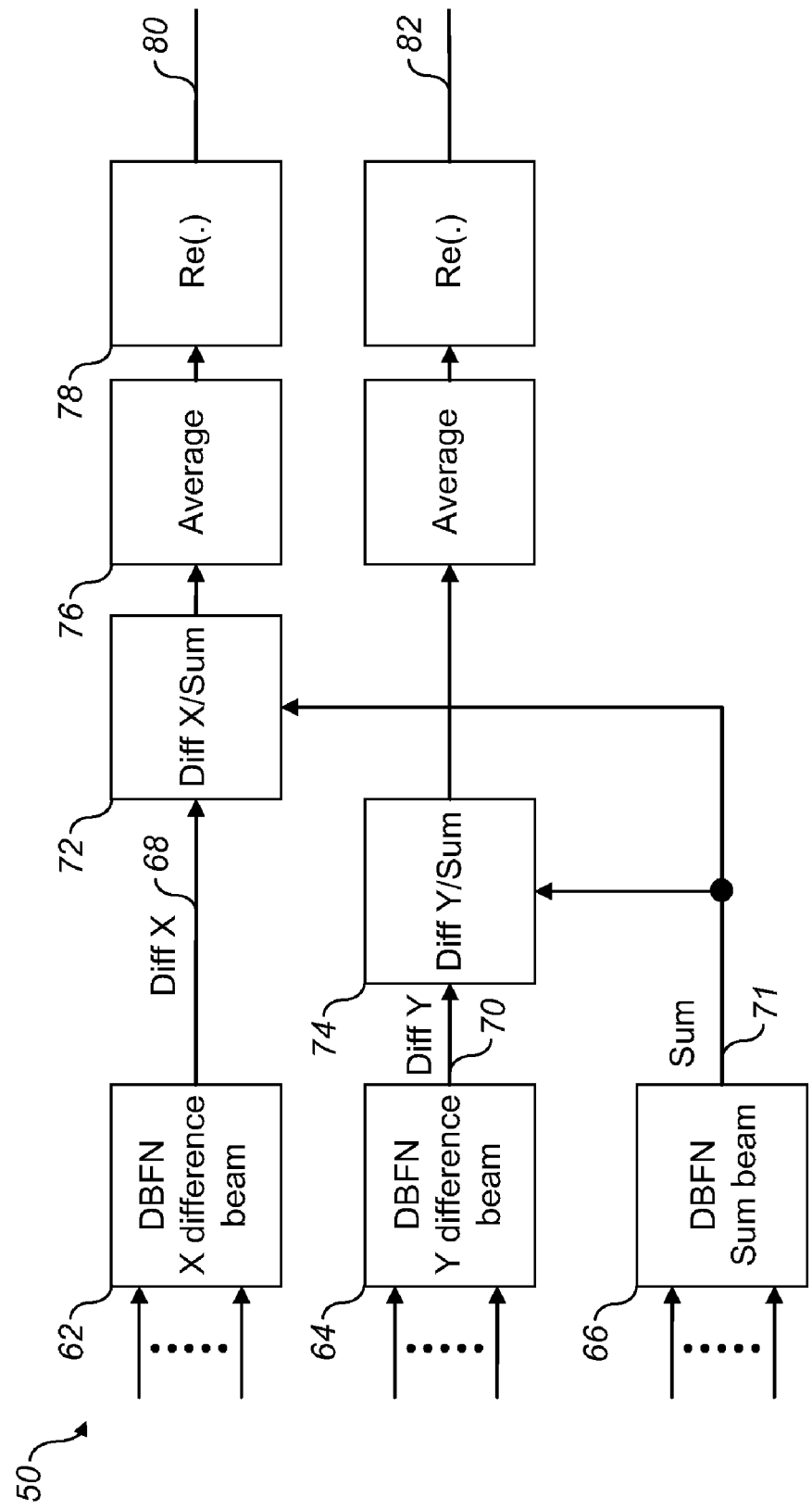
FIG. 3 is a more detailed block diagram of the error mechanism of FIG. 2.
Figure 4:
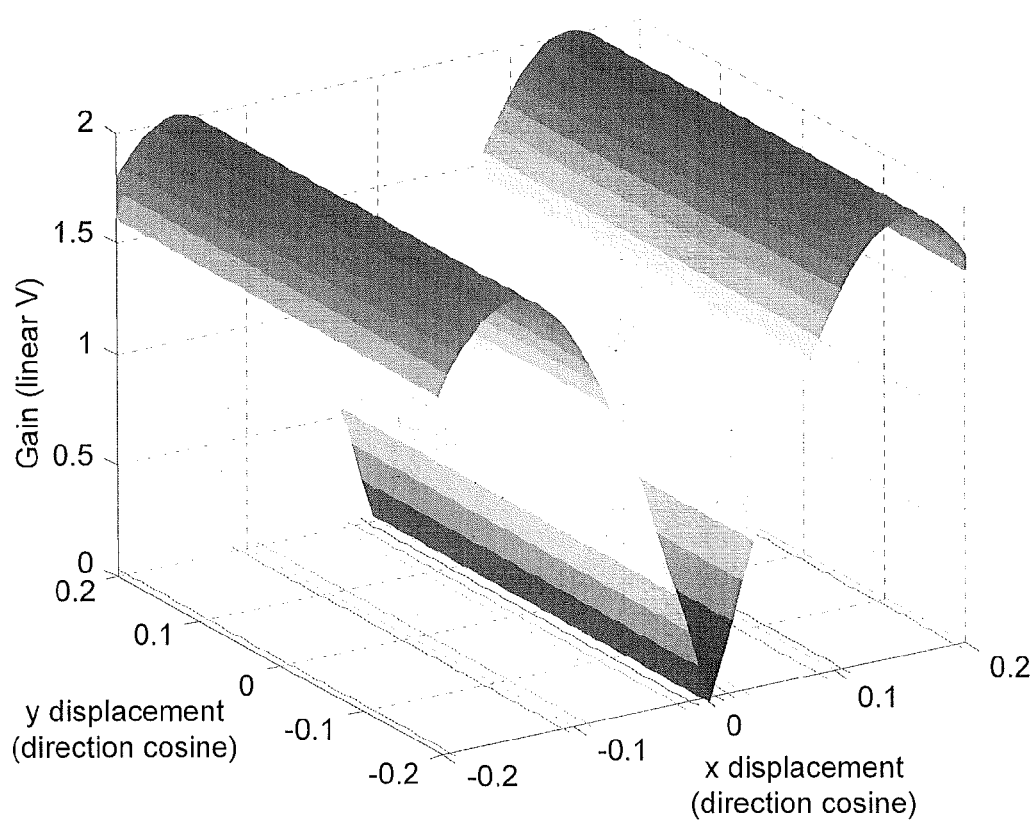
FIG. 4 is a difference radiation pattern for a DRA, as synthesised by digital weights, by the mechanism of FIG. 3.

In the context of the DRA the error signals may typically be formed as follows, with reference to FIG. 3, which shows the RF sensor 50 in more detail, as providing an "x difference beam" radiation pattern (where x and y refer to orthogonal directions across the face of the antenna) formed by a first DBFN 62. DBFN 62 receives the beacon frequency signal components from the antenna element signals, and multiplies each component by a predetermined x difference beam weight, and sums the weighted components to form the output signal 68. The choice of weights is such that a resulting radiation pattern has an amplitude null on an axis perpendicular to the x direction with amplitude rising on either side of the null typically with a 180 degree phase difference; typically the beacon may lie on the null when there no x pointing error (although this is not necessary). A representation of such a radiation pattern is shown in FIG. 4, for a DRA. The complex weights required to form such a pattern may be derived, for example as the complex sum of the weights of 2 spot beams with a 180 degree phase difference and separated in the x direction with the intersection at the required location of the null; this gives appropriate weights by a relatively simple calculation. Hence the term "x difference beam".

Similarly a second DBFN 64 receives the beacon frequency signal components from the antenna element signals, and multiplies each component by a predetermined y direction weight, and sums the weighted components to form the output signal 70, to provide a "y difference beam" radiation pattern orthogonal to the x axis, similar to that shown in FIG. 4.

A third DBFN 66 receives the beacon frequency signal components from the antenna element signals, and multiplies each component by the predetermined weights, and sums the weighted components to form an output signal 71, forming a normalizing "sum beam" radiation pattern (FIG. 5), by adding together the weighted signals. The peak gain is typically at the intersection of the x and y nulls.

The sum pattern is used to normalize the x and y difference patterns at 68, 70 by complex division of the difference patterns by the sum pattern as at 72, 74. The results of the division are averaged over a predetermined time interval as at 76, and the real part of the average is taken as at 78, to form x and y error signals 80, 82 (52, FIG. 2). The x and y error signals are used, within DBFN weight control device 54, in order to calculate required updates to DBFN weights which will correct the x and y pointing errors. The updated weight values are fed to the beam-forming DBFNs 36 (FIG. 2) to adjust or update the complex weights such as to repoint the beams, to compensate for the pointing error.

Figure 6:
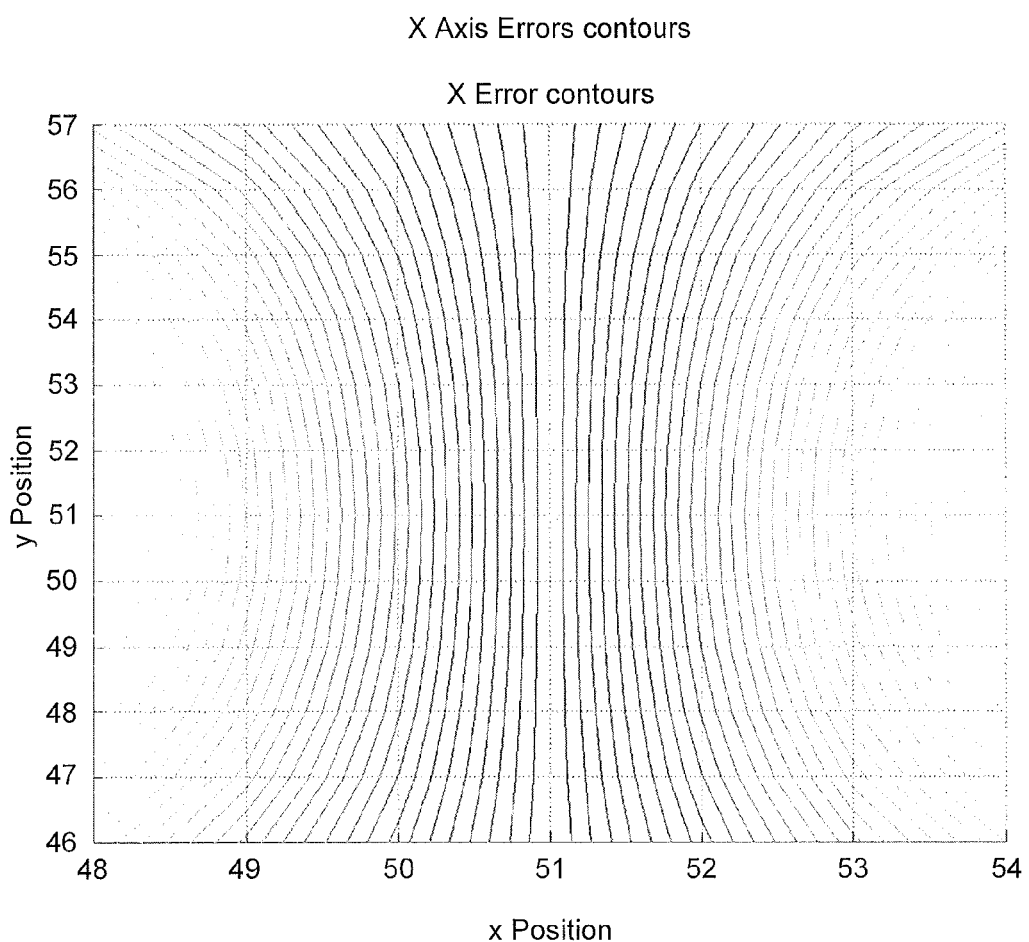
FIG. 6 shows a normalised error pattern, showing contour lines for x direction error values, for varying x and y beam directions.

A representation of such an x error signal is shown in FIG. 6, for a DRA. The x error signal, has opposite sign either side of the null and the amplitude is independent of the beacon signal strength because of the normalization process (i.e. is not affected by atmospheric fades in the beacon signal strength).

The amplitude of the measured x and y error signals uniquely define the error in beacon pointing direction and may be used as a basis for pointing correction within the closed loop system, 50, 54, 36. The physical error signals 80, 82 are formed as an average of the normalized difference pattern samples (real part) with the averaging period optimized to achieve the best balance between noise impact on the error values and time in establishing the error.

The complex weights required to form the pattern shown in FIG. 4 are derived, as stated above, but may be derived in any convenient manner.

Figure 5:
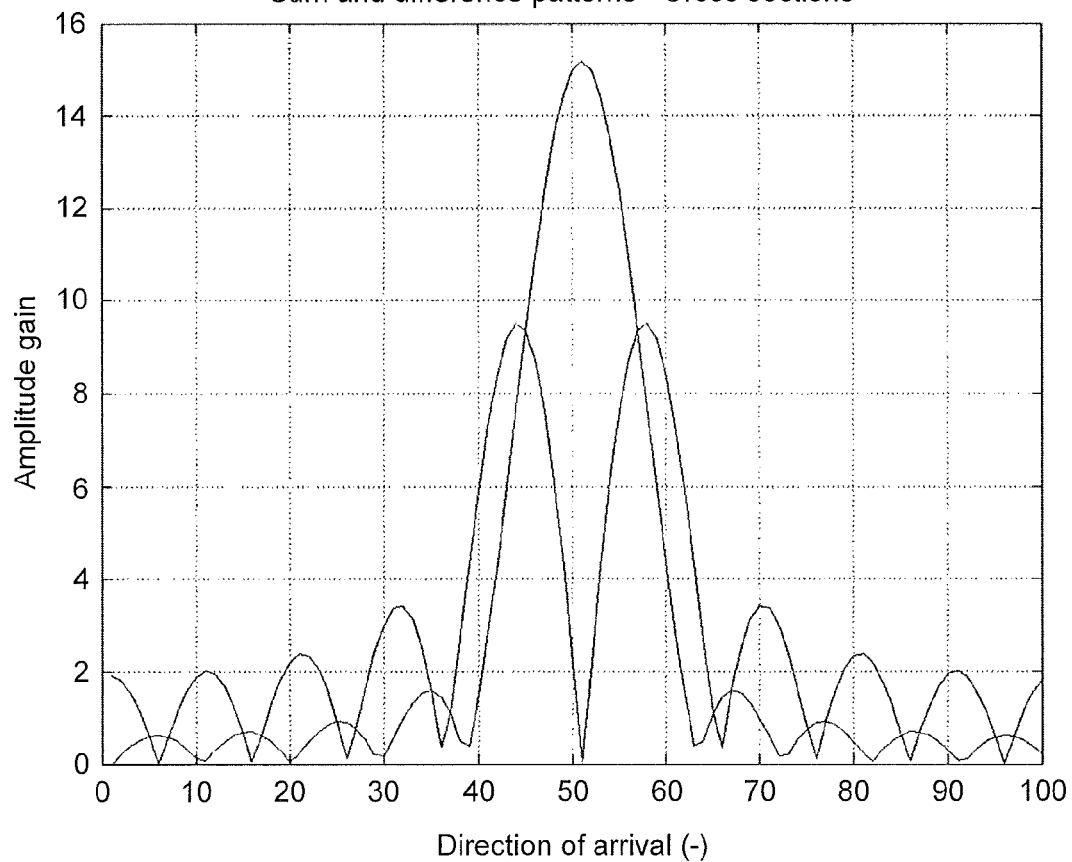
FIG. 5 is a cut through the difference radiation pattern of FIG. 4 along an x direction, and with a corresponding sum pattern superposed.

FIG. 5 shows a pattern cut through the difference pattern along the x direction. Also shown is the corresponding cut through a sum beam formed by selected weights that give a single spot beam located at the intersection of the 2 difference beam lobes (51 degrees in this example).

FIG. 6 shows the x error signal contour pattern formed by normalization of the x tracking pattern by the sum pattern. The amplitude rises on either side of the null but with opposite sign. Note also that the contours are approximately parallel in the central region of the pattern indicating an approximate decoupling of the x error estimate from the y error.

Figure 7:
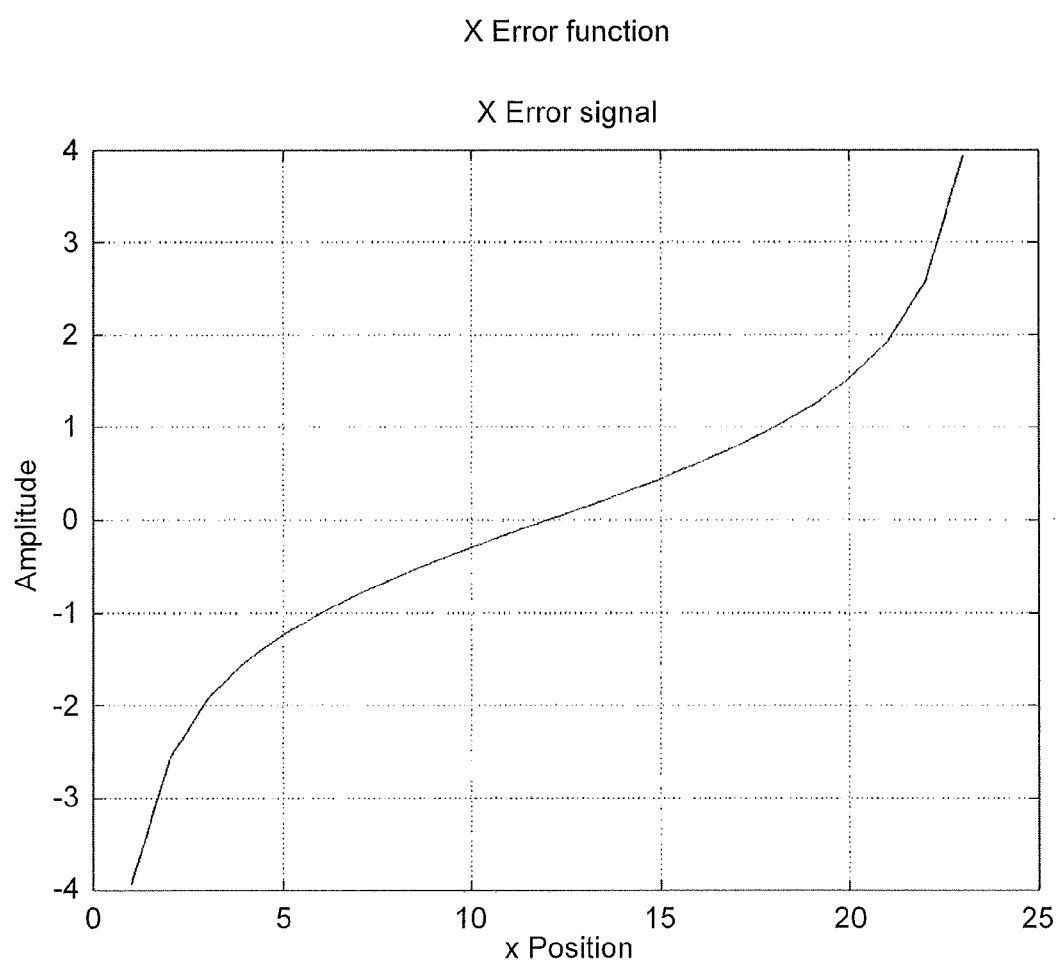
FIG. 7 shows a cut through the error pattern of FIG. 6 for the null error position on the y axis.

FIG. 7 shows the cut through the x error signal contour plot for the case where the y error is zero (y=51 deg). Note that the error signal is of opposite sign either side of the central null and the quasi linear variation of the error signal with beacon error angle, for a central region, approximately 5 degrees either side of the zero error, beam aligned position.

Alternative tracking patterns may be formed by alternative choice of DRA weights. In another example a single difference pattern comprises a single null point with gain increasing radially away from it equally for all azimuth directions but with phase varying though a range of 360 degrees according to azimuth angle. Normalisation of such a pattern, i.e. complex division of the difference pattern by the sum pattern, directly gives both x and y pointing errors derived from the real and imaginary part of the resulting error pattern.

The DBFNs within the RF sensing processor may use some or all of the element signals in the DRA case in order to optimize gain slope in the difference patterns.

The x and y pointing error signals are used as a basis for correcting the pointing of the beams electronically by employing updates to the beam-forming weights. In the case of a DRA antenna the x and y pointing errors may be used to generate updates to the digital beam-forming weight sets (36, FIG. 2) to provide an incremental update to the linear phase gradient across the antenna aperture such as to correct the beam direction. Such an approach assumes that the beacon x and y error is applicable to all the beams formed by the DRA. An additional beacon may be used to provide yaw error data and requires a more complex computation of beam-forming weight errors in that the update in phase gradient will depend on beam location relative to the beacon locations.

Figure 8:
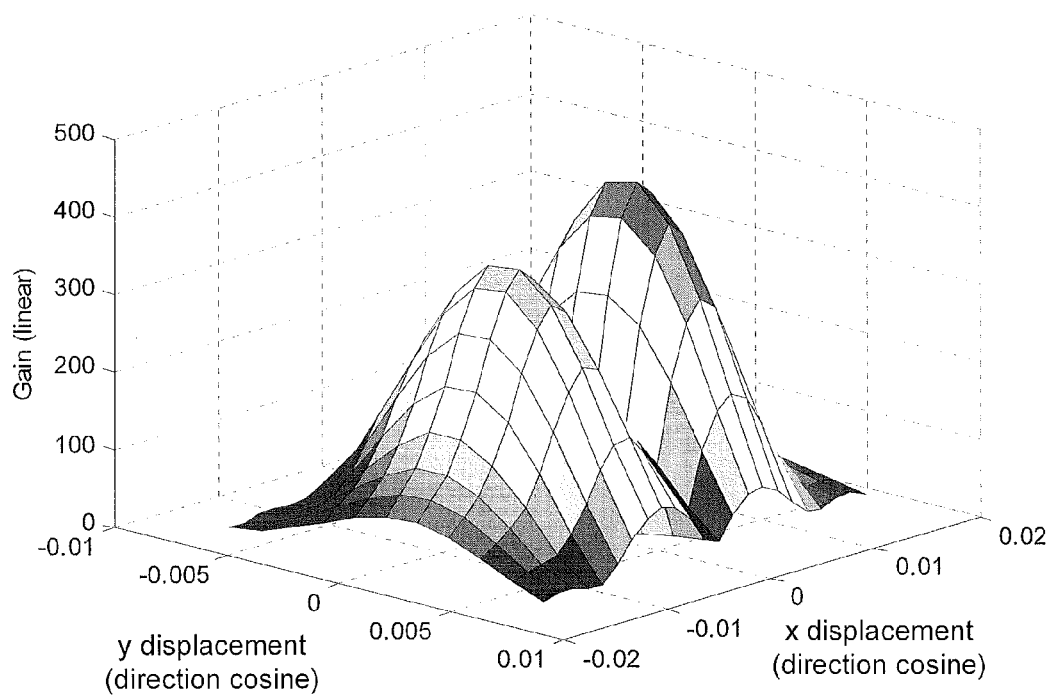
FIG. 8 is a difference radiation pattern for an AFR, as synthesised by digital weights.

In the case of an AFR receive antenna, where the reflector implements a stage of beam-forming such that a given feed is associated with a directional beam in the far field, a similar concept may be employed for forming sum and x,y difference radiation patterns. In particular the circuit of FIG. 3 may be employed. Suitable sum and difference patterns may be formed with simplistic DBFNs utilizing a small number of feeds (potentially only 2 to form a difference pattern in a dimension linking the far field directions associated with the 2 feeds). The choice of feeds to produce the difference patterns will depend on the feed geometry within the AFR (e.g. whether it has square or hexagonal symmetry). An example of a suitable x difference gain radiation pattern for an AFR is shown in FIG. 8 formed by a simplistic DBFN providing the antiphase addition of the signals of 2 adjacent feeds that are separated in the x direction. It will be noted that for the x direction there is a signal null in the direction where the 2 feed beams intersect with the gain rising on either side of the null as the gain of one of the feeds dominates; the phase differs by 180 degrees either side of the null. The angular range shown in FIG. 8 significantly exceeds the maximum expected pointing error such that, for realistic pointing errors, the signal will be close to the null region at x=0 where the gain is seen to monotonically increase. Similarly a y difference pattern is formed by a second simplistic DBFN typically using 2 feeds displaced in the orthogonal y direction. A normalising sum pattern is formed by a third simple DBFN typically providing the in-phase addition of a limited subset of feeds whose beam direction are close to the intersection of the difference pattern nulls.

For the case of an AFR the update to the beam weights is less straightforward than the DRA, requiring an update to the weights sets used to form each of the spot beams. This may, for example, be achieved by pre-computation of optimised weight sets to implement various beam-pointing shifts with selection of weight sets according to measured pointing error. In order to limit the number of weight sets, this may be complemented by a further interpolation process between weight sets in order to give a higher resolution of pointing control. The pointing error established for a receive antenna may be used to correct the pointing error of a transmit antenna if it is known that the pointing errors of both antennas are correlated, e.g. they may share the same elements or the pointing error may be entirely due to the spacecraft attitude thus equally effecting both antennas.

In a further form of the invention the x and y pointing error signals are used as a basis of correcting the pointing of the antenna by conventional means. In performing such correction it is assumed that the pointing error for the beacon is correlated with the pointing error to all the communications beams formed by the antenna. In one such approach the correction is implemented by changing the attitude of the spacecraft. If there is a single beacon the x and y pointing errors in the beacon direction may be corrected by adjustment of the pitch and roll of the spacecraft. Such an approach will however not serve to correct beam-pointing error due to spacecraft yaw error for the case of beams that are spatially distant from the beacon direction. The invention may be extended in this case to include a second beacon at a different location on the earth. The x and y error signals associated with the 2 beacons may be processed according to simple trigonometric rules to yield an additional yaw pointing error which may be corrected through the spacecraft attitude control system together with the pitch and roll.

Alternatively the pointing error may be corrected by a mechanical antenna pointing mechanism. This may employ pitch and roll tilts to the antenna (or just the reflector in the case of the AFR). Correction of yaw error is less straightforward requiring a rotation of the antenna about the bore-sight axis.

The above discussion has assumed that the pointing errors of the beams to be correlated, e.g. due to spacecraft pitch and roll errors which equally effect all the beams. In a further variation on the invention it is recognized that the pointing error of different spot beams may not be correlated. Uncorrelated pointing errors may be due to weight errors in a DRA or feed alignment errors in an AFR or uncertainty in location of terminals on the ground. The uplink communications signals may in this case serve as beacons with x and y pointing errors being used to electronically control pointing on an individual beam basis. In this case each frequency channel will require additional x and y difference pattern beam-forming networks. The main communications beam-forming network can form a suitable normalizing sum signal. Correction of the beam-pointing will necessarily be implemented through the weights of DBFNs because the correction will differ between beams. Such a system has the potential to point a high gain spot beam at a specific ground terminal for which the location is not accurately known and indeed may provide location data through the satellite telemetry system.

The physical implementation of the invention takes the form of an extension of the implementation of the digital processing that is required for the digital beam-forming system with the addition of the processing algorithms associated with the pointing error evaluation and the beam-forming weight set updates required to correct the pointing. This represents a minimal addition to the complexity of the digital beam-forming system in terms of arithmetic processing rate. The implementation is therefore in the form of a radiation hardened chip technology suitable for use in the space environment, typically being based on ASIC, FPGA or microprocessor technologies.

The invention claimed is:

1. A method for adjusting the pointing direction of a beam provided by an antenna system of a spacecraft, the spacecraft forming part of a system that includes ground stations communicating with the antenna system of the spacecraft using uplink signals and downlink signals, each in a respective frequency channel, the antenna system including a receive antenna having a plurality of antenna elements arranged in an array, each element providing a respective antenna element signal and at least one of said uplink signals including a beacon signal, the method comprising:

digitising each said antenna element signal from said receive antenna, and processing each digitised antenna element signal to separate uplink signal components in respective frequency channels present in the element signal;

digitally weighting, with respective beam-pointing error weight values, components of said beacon signal present in at least some of the receive antenna element signals, and assessing such weighted beacon signal components to derive a beam-pointing error signal; and employing said error signal to adjust the pointing direction of at least one communications signal beam provided by said antenna system.

2. A method according to claim 1, wherein the antenna system further includes a transmit antenna, including a plurality of antenna elements arranged in an array, each element having an associated respective antenna element signal, and the method further comprises:

providing downlink signals in respective frequency channels and in digital form, which are selectively digitally weighted, with respective beam-forming weight values, to synthesise downlink antenna element signals for the antenna elements of said transmit antenna, and wherein employing said error signal to adjust the pointing direction of at least one communications signal beam provided by said antenna system comprises:

employing said error signal to adjust the pointing direction of at least one communications signal beam provided by said transmit antenna.

3. A method according to claim 1, wherein said receive antenna is a Direct Radiating Array or Imaged Phased Array, comprising an array of antenna elements providing respective element signals.

4. A method according to claim 1, wherein said receive antenna is an Array Fed Reflector comprising an array of antenna elements directed at a reflector, and providing respective antenna element signals.

5. A method according to claim 1, wherein the beam that is corrected is a beam of the receive antenna.

6. A method according to claim 1, wherein the beam that is corrected is a beam of a transmit antenna of the antenna system.

7. A method according to claim 1, further comprising digitally weighting, with respective beam-forming weight values, said uplink signal components in at least one frequency channel, and combining the weighted components to synthesise the uplink signal in said at least one frequency channel.

8. A method according to claim 2 or 7, including providing a first set of said weighted beacon signal components, and combining them to derive a first combined weighted value relating to beam-pointing error for a first axis of the receive antenna.

9. A method according to claim 8, including providing a second set of said weighted beacon signal components and combining them to derive a second combined weighted value relating to beam-pointing error for a second axis of the receive antenna.

10. A method according to claim 9, wherein the receive antenna is an Array Fed Reflector, and said first set and/or said second set comprises first and second weighted beacon signal components of element signals of antenna elements separated along a said axis.

11. A method according to claim 9, wherein said first set and/or second set relate to a difference radiation pattern, and the method further including providing a third set of said weighted beacon signal components, which are combined to derive a combined sum value relating to a sum radiation pattern, and normalising said first and/or second combined weighted values by division by said combined sum value, in order to derive first and/or second beam-pointing error signals.

12. A method according to claim 2 or 7, wherein the beam-pointing error weight values synthesise a difference radiation pattern along a first axis of the receive antenna, with a signal null, and with the amplitude rising on either side of the null, but with a phase difference on either side of the null.

13. A method according to claim 12 wherein the beam-pointing error weight values synthesise a difference radiation pattern along a second axis of the receive antenna, with a signal null, and with the amplitude rising on either side of the null, but with a phase difference on either side of the null.

14. A method according to claim 12, wherein the phase difference is 180°.

15. A method according to claim 2 or 7, wherein said beam-pointing error weight values are chosen so as to synthesise a radiation pattern for the receive antenna, wherein antenna gain values change significantly for changes in beam direction, at least over a certain range of beam directions corresponding to beam-pointing errors that frequently occur.

16. A method according to claim 2 or 7, wherein said pointing direction is corrected by adjusting the attitude of the satellite in pitch and roll.

17. A method according to claim 2 or 7, wherein the pointing error is adjusted by a mechanical antenna pointing mechanism.

18. A method according to claim 2 or 7, wherein said pointing direction is corrected by adjusting said beam-forming weight values, in dependence on said error signal.

19. A method according to claim 18, wherein said receive antenna is an Array Fed Reflector, and wherein said adjusting is carried out by selection of pre-computed weight sets in accordance with values of the error signal.

20. A method according to claim 2 or 7, wherein an uplink communication beam from a ground station of known location also acts as a beacon for the purpose of measuring beam-pointing error.

21. A method according to claim 2 or 7, wherein a plurality of receive beams of the antenna are uncorrelated, and each uplink signal forms a respective beacon signal for the respective beam.

22. A method according to claim 2 or 7, wherein a further beacon signal is provided to provide a further error value, where the yaw angle of the spacecraft may create errors in addition to pitch and roll.

23. Apparatus for a spacecraft, comprising:
a receive antenna including a plurality of antenna elements arranged in an array, each antenna element providing a respective antenna element signal in response to received uplink signals in respective frequency channels;
digital processing means for digitising each said antenna element signal and for separating uplink signal components in respective frequency channels present in each said antenna element signal;
beam-pointing error weighting means for digitally weighting components of a beacon signal comprising one of said uplink signals in a respective frequency channel, and being present in at least some of the antenna element signals, with respective beam-pointing error weights;
assessment means for assessing the weighted beacon signal components to derive a beam-pointing error signal; and
adjustment means for employing said error signal to adjust the pointing direction of at least one communications signal beam provided by the spacecraft.

24. Apparatus according to claim 23, further comprising:
a transmit antenna including a plurality of antenna elements arranged in an array, each antenna element providing a respective antenna element signal;
digital processing means for selectively forming downlink signals in respective frequency channels; and
beam-forming weighting means for selectively digitally weighting downlink signals in respective frequency channels with respective beam-forming weight values, for providing antenna element signals to said transmit antenna.

25. Apparatus according to claim 23, further comprising beam-forming weighting means for digitally weighting said uplink signal components in at least one frequency channel with respective beam-forming weight values and combining means for combining such selected components to synthesise at least one uplink signal in a respective frequency channel.

26. Apparatus according to claim 24 or 25, wherein said receive antenna is a Direct Radiating Array or Imaged Phased Array, comprising an array of antenna elements providing respective element signals.

27. Apparatus according to claim 24 or 25, wherein said receive antenna is an Array Fed Reflector comprising an array of antenna elements directed at a reflector, and providing respective antenna element signals.

28. Apparatus according to claim 27, wherein said assessment means comprise combining means for combining first and second said weighted beacon signal components of element signals of first and second spaced apart elements to determine at least one beam-pointing error value, and normalisation means responsive to said one error value to derive said beam-pointing error signal.

29. Apparatus according to claim 24 or 25, wherein said assessment means comprise combining means for combining selected weighted beacon signal components to determine at least one beam-pointing error value, and normalisation means responsive to said one error value to derive said beam-pointing error signal.

30. Apparatus according to claim 24 or 25, wherein said beam-pointing error weighting means includes a first difference digital beam-forming network responsive to said beacon signal components, and having a first set of beam-pointing error weights for determining an x difference radiation pattern value along a first direction (x) of the antenna.

31. Apparatus according to claim 30, wherein said beam-pointing error weighting means includes a second difference digital beam-forming network responsive to said beacon signal components, and having a second set of beam-pointing error weights for determining a y difference radiation pattern value along a second direction (y) of the antenna.

32. Apparatus according to claim 31, including a further sum digital beam-forming network responsive to said beacon signal components and having a set of beam-pointing error weights for determining a sum radiation pattern value, and including normalisation means for dividing said first and/or second difference pattern values by said sum value to provide first and/or second beam-pointing error signals.

33. Apparatus according to claim 24 or 25, wherein said beam-pointing error weight values provide a synthesized radiation pattern along one axis of the antenna array, with a signal null, and with the amplitude rising on either side of the null, but with a phase difference on either side of the null.

34. Apparatus according to claim 33, wherein the beam-pointing error weight values synthesise a radiation pattern along another axis of the antenna, with a signal null and with the amplitude rising on either side of the null, but with a phase difference on either side of the null.

35. Apparatus according to claim 24 or 25, wherein said adjustment means is operative to adjust the attitude of the satellite in pitch and roll.

36. Apparatus according to claim 24 or 25, wherein said adjustment means is operative to adjust a mechanical antenna pointing mechanism.

37. Apparatus according to claim 24 or 25, wherein said adjustment means is operative to adjust said beam-forming weight values, in dependence on said error value.

38. Apparatus according to claim 37, said adjustment means including weight control means, which acts to adjust said beam-forming weight values.

39. Apparatus according to claim 38, wherein a said antenna is an Array Fed Reflector, and wherein said adjustment means includes pre-computed weight sets, and means for selecting a weight set.

40. Apparatus according to claim 37, wherein the beam-forming weight values that are corrected relate to a beam of the receive antenna.

41. Apparatus according to claim 37, wherein the beam-forming weight values that are corrected relate to a beam of a transmit antenna.

42. Apparatus according to claim 24 or 25, including means responsive to a second beacon signal for deriving a further beam-pointing error signal.

43. Apparatus for a spacecraft, comprising:

a receive antenna including a plurality of antenna elements arranged in an array, each antenna element providing a respective antenna element signal in response to received uplink signals in respective frequency channels;

an uplink signal synthesiser for digitising each antenna element signal and separating uplink signal components in respective frequency channels present in each antenna element signal;

a beacon direction assessment processor responsive to a beacon signal comprising one of said uplink signals in a respective frequency channel and configured to digitally weight components of said beacon signal present in at least some of the antenna element signals with respective beam-pointing error weights, and assess the weighted beacon signal components to derive a beam-pointing error signal; and a controller for employing said error signal to adjust the pointing direction of at least one communications signal beam provided by the spacecraft.

* * * * *